(12) United States Patent
Wu et al.

(10) Patent No.: US 11,907,118 B2
(45) Date of Patent: Feb. 20, 2024

(54) INTERLEAVED DATA CONVERSION TO CHANGE DATA FORMATS

(71) Applicant: Intel Corporation, Santa Clara, CA (US)

(72) Inventors: Yong Wu, Shanghai (CN); Mohammad Haghighat, San Jose, CA (US); Zhong Cao, Shanghai (CN); Feng Yuan, Shanghai (CN); Hongzhen Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/054,083

(22) PCT Filed: Nov. 7, 2019

(86) PCT No.: PCT/CN2019/116172
§ 371 (c)(1),
(2) Date: Nov. 9, 2020

(87) PCT Pub. No.: WO2021/087841
PCT Pub. Date: May 14, 2021

(65) Prior Publication Data
US 2023/0153240 A1    May 18, 2023

(51) Int. Cl.
   *G06F 12/06* (2006.01)
   *G06F 9/30* (2018.01)

(52) U.S. Cl.
   CPC ........ *G06F 12/0607* (2013.01); *G06F 9/3001* (2013.01); *G06F 2212/251* (2013.01)

(58) Field of Classification Search
   CPC ............... G06F 9/3001; G06F 12/0607; G06F 2212/251; G09G 2360/123

USPC ......................................................... 711/157
See application file for complete search history.

(56) References Cited

U.S. PATENT DOCUMENTS

| | | | | |
|---|---|---|---|---|
| 7,555,684 B1 * | 6/2009 | Mazahreh | ............. | H04L 1/0055 714/702 |
| 7,954,015 B1 * | 5/2011 | Dhanoa | ............. | H03M 13/2771 714/787 |
| 8,402,348 B1 * | 3/2013 | Gunnam | ............... | H03M 13/27 714/773 |
| 2003/0231121 A1 * | 12/2003 | Sakaguchi | ............... | H03M 7/24 341/83 |

(Continued)

FOREIGN PATENT DOCUMENTS

CN    104572480 A  *  4/2015  ......... G06F 12/0607

OTHER PUBLICATIONS

Kalamkar, Dhiraj, et al. "A study of BFLOAT16 for deep learning training." arXiv preprint arXiv:1905.12322 (2019). (Year: 2019).*

(Continued)

*Primary Examiner* — Reginald G Bragdon
*Assistant Examiner* — Aaron D Ho
(74) *Attorney, Agent, or Firm* — Jordan IP Law, LLC

(57) ABSTRACT

Method, systems and apparatuses may provide for technology that identifies first data and second data to be stored in a data storage. Each of the first data and the second data are in a first data format. Some technology may also interleave the first data with the second data. The interleaved first and second data are in a second data format. The second data format is different from the first data format.

24 Claims, 12 Drawing Sheets

(56) References Cited

U.S. PATENT DOCUMENTS

| | | | | |
|---|---|---|---|---|
| 2007/0011502 A1* | 1/2007 | Lin | ................... | H03M 13/2703 |
| | | | | 714/702 |
| 2011/0202819 A1* | 8/2011 | Lin | ................... | H03M 13/2957 |
| | | | | 714/776 |
| 2014/0036984 A1* | 2/2014 | Charbonneau | ...... | H04L 25/0258 |
| | | | | 375/233 |
| 2015/0121019 A1* | 4/2015 | Dasika | ....................... | G06F 9/00 |
| | | | | 711/157 |
| 2017/0308383 A1* | 10/2017 | Espasa | ................ | G06F 9/30145 |
| 2019/0068221 A1* | 2/2019 | Chen | ................... | G11B 5/59616 |

OTHER PUBLICATIONS

Dorit Nuzman, Ira Rosen, and Ayal Zaks. 2006. Auto-vectorization of interleaved data for SIMD. SIGPLAN Not. 41, 6 (Jun. 2006), 132-143. https://doi.org/10.1145/1133255.1133997 (Year: 2006).*

* cited by examiner

INTERLEAVED DATA CONVERSION TO CHANGE DATA FORMATS

CROSS REFERENCE TO RELATED APPLICATIONS

The present application is a U.S. National Phase Patent Application, which claims the benefit of priority to International Patent Application No. PCT/CN2019/116172 filed on Nov. 7, 2019.

TECHNICAL FIELD

Embodiments generally relate to the interleaving of data to efficiently exploit various features of computing architectures. More particularly, embodiments relate to interleaving two or more numbers together to reduce memory bandwidth and latency as well as to facilitate execution on hardware elements.

BACKGROUND

Many compute cycles in certain workloads (e.g., deep learning workload and/or neural network learning) may include operations that are memory bandwidth intensive. For example, data may be stored in a cache, and then loaded into registers when a mathematical operation (e.g., matrix multiplication) is to execute based on the data. For example, a deep learning workload and/or a neural network learning may execute matrix multiplication to determine weights. Memory bandwidth may be an import factor for both computation and communication sensitive operations, such as Matrix Multiply and convolution. Furthermore, performance indicators for these operations may be largely influenced by throughput (e.g., cycles per instruction or CPI) of latency heavy instructions.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
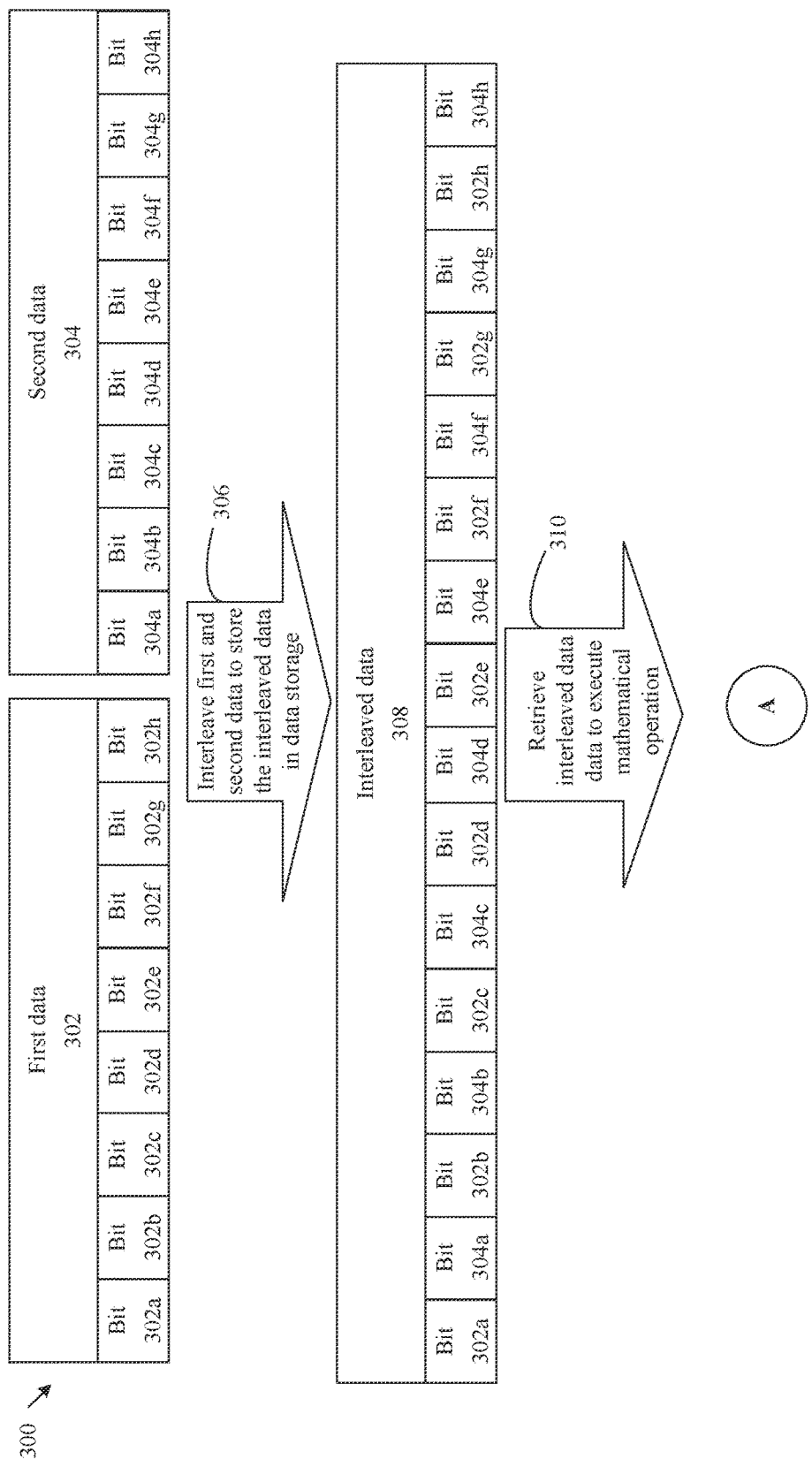
FIGS. 1A and 1B illustrate an example of a process of interleaving, storing, loading and extracting data according to an embodiment.
Figure 1B:
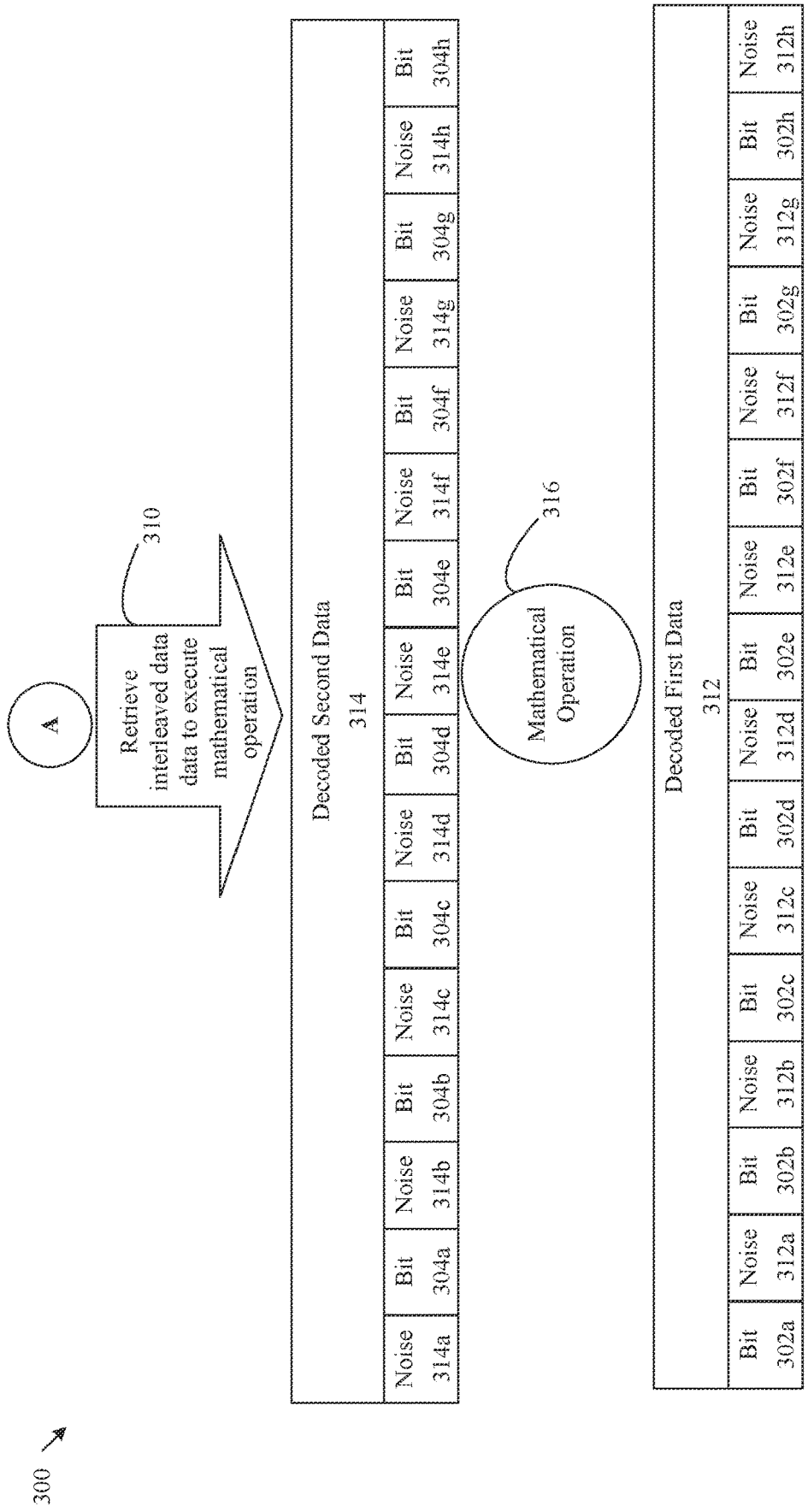

FIGS. 1A and 1B illustrate a process 300 to interleave store, load and extract first and second data 302, 304. The first and second data 302, 304 may be in a first data format (e.g., BFloat16 or brain floating-point) that is a truncated (e.g., 16-bit) version of a second data format (e.g., 32-bit, Float32 floating-point). Some applications may execute operations based on the first and the second data 302, 304 to accelerate operations, such as deep learning and near-sensor computing. While the first data format may not be as precise as the second data format, the first data format may still allow for accurate computations (e.g., for training and inference of deep learning applications) at reduced processing power, increased speed and reduced memory bandwidth.

Depending on the underlying computer architectures, some storage and load formats may operate based on the second data format, thus causing a data format mismatch between the underlying computer architecture and some applications that prefer the first data format. In some cases, costly software conversions may be implemented to cope with the data format mismatch. Doing so may reduce memory bandwidth, but slows down computation launch, resulting in a detrimental effect. As discussed below, process 300 mitigates such mismatches while avoiding such detrimental effects to reduce memory bandwidth and mitigate high-latency computational launches.

Process 300 may include interleaving the first and second data 302, 304 to store the interleaved data 308 in a data storage 306 (e.g., cache, memory, long-term memory such as a Solid-State Drive, etc.). That is, the first and second data 302, 304 may be interleaved. In doing so, one interleaved coding solution and decoding solution (explained further below) for storage may be implemented that reduces or completely avoids a penalty of additional conversions between different data formats (e.g., first and second data formats), while also reducing memory bandwidth. Thus, flexibility and agility may be achieved through the access to different data formats without excessive penalties and conversions.

The process 300 may further enhance computational workloads by interleaving the first and second data 302, 304 to store the interleaved data 308 in a data storage 306 at a computationally insensitive point in application processing. For example, suppose that first and second data 302, 304 are generated and used by an application. The application may have periods of high computational workloads that may result in limited resources (e.g., memory bandwidth, processors, accelerators, etc.). Process 300 may consider whether an amount of available resources meets a threshold. If so, process 300 may then interleave the first and second data 302, 304 to store the interleaved data 308 in a data storage 306.

In some embodiments, the process 300 may further predict whether an operation of the application will execute based on the first and the second data 302, 304. If an application will utilize the first and the second data 302, 304 within a certain time frame, process 300 may interleave the first and second data 302, 304 to store the interleaved data 308 in a data storage 306. In some embodiments, if the first and the second data 302, 304 are to be utilized within the time frame, the process 300 may interleave the first and the second data 302, 304 regardless of the available resources. In doing so, resource intensive conversion operations may be avoided when the application utilizes the first and second data 302, 304 to avoid high-latency computational launches.

As illustrated, the first data 302 may comprise bits 302*a*-302*h*. Second data 304 may comprise bits 304*a*-304*h*. While a certain number of bits 302*a*-302*h* and 304*a*, 304*h* are shown, it will be understood that this number may be different without altering the scope of this discussion. Process 300 may interleave the first and the second data 302, 304 to store the first and second data 302, 304 in a data storage.

Thus, the first and the second data 302, 304 may be interleaved to generate interleaved data 308. The interleaved data 308 may be in the second data format that is different from the first data format of the first and second data 302, 304. That is, the interleaved data 308 may include bits 302*a*-302*h* of the first data 302 that alternate with bits 304*a*, 304*h* of the second data 304 in a continuous and adjacent fashion. Thus, a size of the first data 302 may be approximately half a size of the interleaved data 308, and a size of the second data 304 may be approximately half a size of the interleaved data 308.

Corresponding bit positions (e.g., zero-bit, first bit, etc.) of the first data 302 and the second data 304 may be stored directly next to each other. Thus, bit 302*h* (e.g., bit position zero) of the first data 302, may be stored next to bit 304*h* (e.g., bit position zero) of the second data 304, and so on until bit 302*a* (e.g., bit position seven) of the first data 302, is stored next to bit 304*a* (e.g., bit position seven) of the second data 304.

The interleaved data 308 avoids less efficient methods to store the first data 302 and the second data 304. For example, a less efficient method may separate the first data 302 and the second data 304 into non-continuous and non-interleaved storage areas and pad each of the first data 302 and the second data 304 with padding bits until the first data 302 and the second data 304 are each in the second data format. For example, in less efficient methods, the first data 302 may be padded (e.g., to maintain 16 bits) and stored in a first memory area, and the second data 304 may be padded (e.g., to maintain 16 bits) and stored in a second memory area that does not overlap with the first memory area. Doing so requires more memory footprint and at least two high latency operations for storing. In contrast, the above interleaving and storing has a smaller memory footprint and may include only one storing.

The above modification to generate the interleaved data 308 may reduce the bandwidth by half through an acceptable precision loss. It should be noted that the interleaved data 308, the first data 302 and/or the second data 304 may include some padding bits (e.g., bits having a default value of zero) as long as the accuracy range is within acceptable parameters for an application.

The interleaved data 308 may be stored in a data storage. For example, the interleaved data 308 may be stored in a contiguous and unbroken memory area of a cache so that each bit 302*a*-302*h* is adjacent one or more bits 304*a*-304*h*. Thus, in the interleaved data 308, only the bits 302*b*-302*h*, 304*a*-304*g* from the first and second data 302, 304 may be disposed between the highest bit 302*a* and lowest bit 304*h*.

In FIG. 1B, process 300 may retrieve the interleaved data 308 to execute a mathematical operation 310, 316. It is worthwhile to note that in some embodiments, retrieving the interleaved data 308 may include only one load operation from the data storage. The mathematical operation 316 may execute based on the first and the second data 302, 304.

In order to generate the decoded second data 314, process 300 may treat the bits 302*a*-302*h* of the first data 302 as noise 314*a*-314*h* and/or padding bits for the decoded second data 304. That is, the contents of the bits 302*a*-302*h* may be treated as noise 314*a*-314*h* when decoding the second data 314 and/or executing the mathematical operation 316. The decoded second data 314 may be stored in a first hardware register. As is illustrated, the decoded second data 314 includes all the bits 304*a*-304*h* of the second data 304.

Similarly, in order to generate the decoded first data 312, process 300 may treat the bits 304*a*-304*h* of the second data 304 as noise 312*a*-312*h* and/or padding bits for the decoded first data 312. That is, the contents of the bits 304*a*-304*h* may be treated as noise 312*a*-312*h* when generating the decoded first data 312 and/or executing the mathematical operation 316. The decoded first data 312 may be stored in a second hardware register. As is illustrated, the decoded first data 312 includes all the bits 302*a*-302*h* of the first data 302.

Thus, for example, with the decoded first data 312, the bits 304*a*-304*h* from the second data 304 may be treated as noise 312*a*-312*h*, not simply a same padding value. For example, for decoded first data 312, if bit 302*a* is the beginning value of decoded first data 312, the noise may be a random padding value on a left of bit 302*a* and/or one or more of the noise values 312*a*-312*h*. In some embodiments, doing so may enhance accuracy in deep-learning during certain processes, such as normalization. Given enough randomness with noise, the process should produce better accuracy than truncation or padding with a same certain value.

In contrast, some designs may include all a same value (e.g., zeros) in lower padding bits which does not contribute towards deep-learning in a meaningful way and may degrade deep-learning, and furthermore do not correspond to data that will be used in such processes besides as padding. For example, for little endian system, no matter the decoded data, adjacent lower bits will be treated as noise for higher bits. Having all the same value may degrade accuracy. For example, having all zeros as the lower bits may result in truncation that causes loss of the numbers after —2.4 decimal places.

Likewise, with the decoded second data 314, the bits 302*a*-302*h* of the first data 302 may be treated as noise 314*a*-314*h* during execution of the mathematical operation 316 to enhance accuracy.

The mathematical operation 316 may accept the decoded first data 312 and decoded second data 314 as inputs. The mathematical operation 316 may then execute to modify the decoded first and second data 312, 314 based on each other and to generate an output. For example, the mathematical operation 316 may be a matrix multiplication operation that accepts the decoded first data 312 as a first matrix, the decoded second data 314 as a second matrix, and multiples the first and second matrices with each other to generate an output.

Process 300 may be applicable to various data types and operations, such as scalar and vector operations. Process 300 may therefore relieve memory bandwidth issue for certain applications such as deep learning and/or high-performance computing applications while mitigating side effects. For example, it may be possible for an application to efficiently execute computations in a first data format while a computing architecture utilizes a second data format. Thus, doing so allows deployment of the first data format (e.g., BFloat 16)

on both current and subsequent hardware products that operate on a second data format and/or accept instructions in the second data format (e.g., Float 32).

Further, memory bandwidth may be an import factor for both computation and communication sensitive operations, such as Matrix Multiply and convolution. More specifically, performance indicators for these operations may be strongly influenced by the throughput (CPI) of pipelined LOAD, fused-multiply and add (FMA) and STORE. For, some cases, applications may utilize the first data format (e.g., BFloat16) as a storage type to save memory bandwidth compared with the larger second data format (e.g., Float 32), but still use the second data format to participate in FMA computations. Thus, a conversion from the first data format to the second data format may be necessary. The above process 300 may execute such a conversion at computationally insensitive points without incurring excessive overhead.

Figure 2:
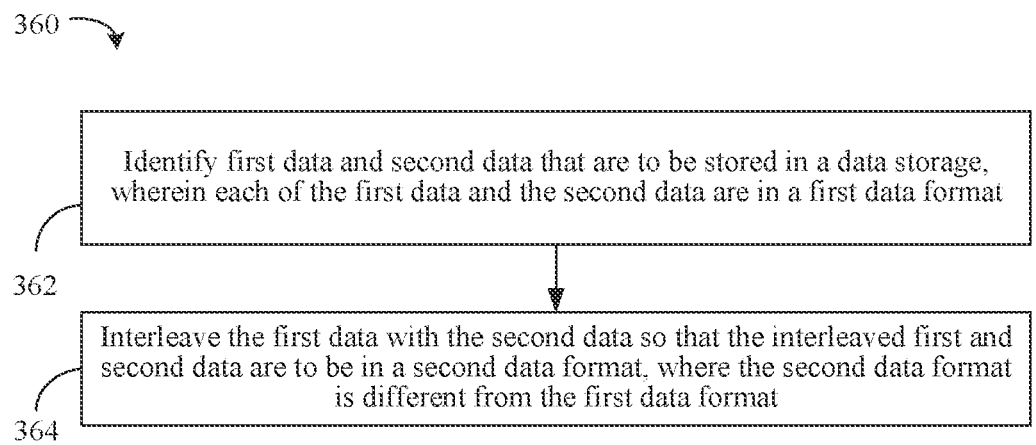
FIG. 2 is a flowchart of an example of a method of data processing according to an embodiment.

FIG. 2 shows a method 360 that may provide enhanced data processing. The method 360 may generally be implemented by a computing device 100 and operate in conjunction with any of the embodiments described herein, such as, for example the process 300 (FIG. 1), already discussed. In an embodiment, the method 360 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 360 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 362 identifies first data and second data to be stored in a data storage. Each of the first data and the second data are in a first data format. For example, the first data format may be in Bfloat16 format. Illustrated processing block 364 interleaves the first data with the second data. The interleaved first and second data are in a second data format. The second data format is different from the first data format. For example, the second data format may be Float32.

Figure 3:
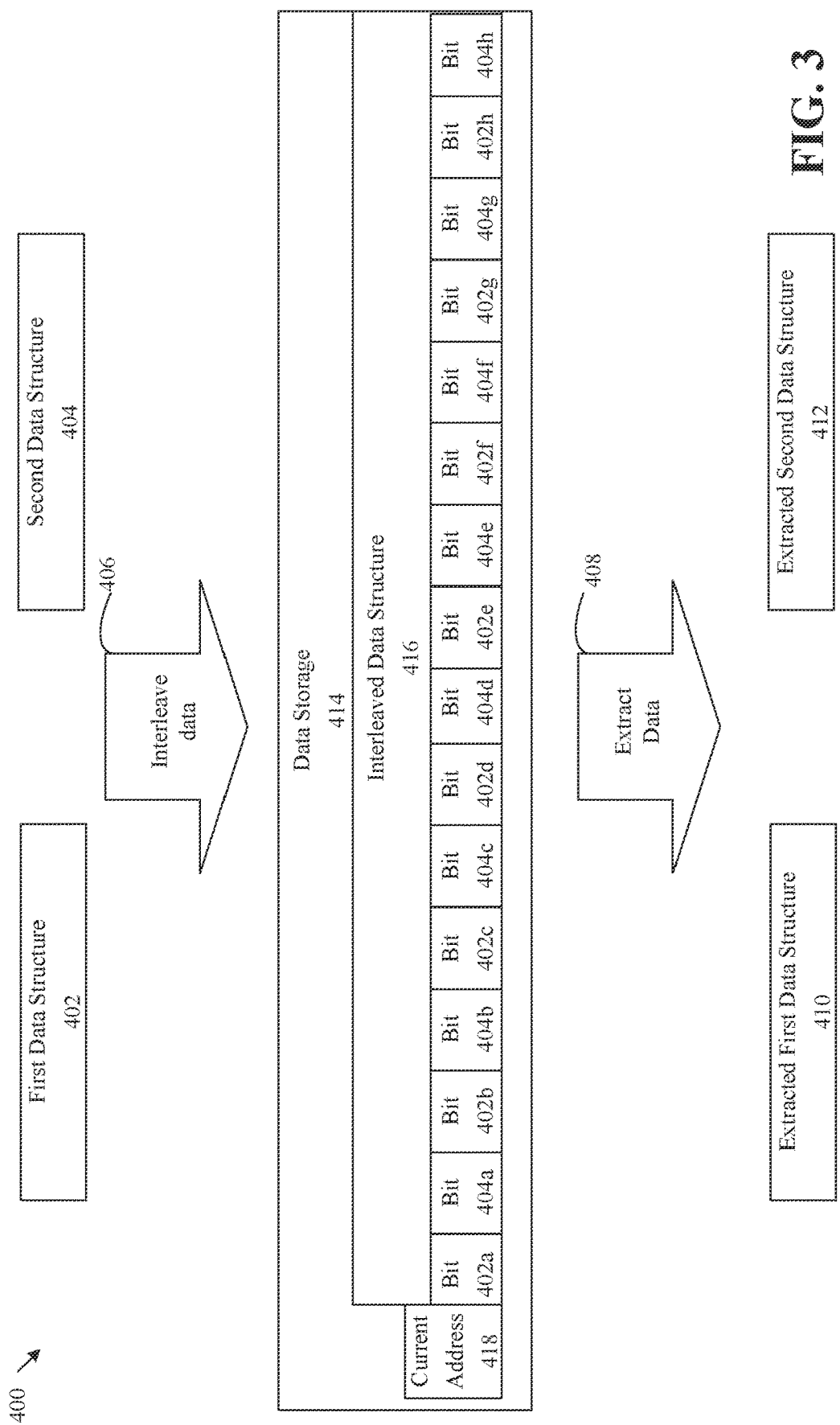
FIG. 3 illustrates an example of a process to generate and access an interleaved data structure according to an embodiment.

FIG. 3 illustrates a process 400 to generate and access an interleaved data structure 416. The interleaved data structure 416 may be generated according to process 300 of FIGS. 1A and 1B, and/or the method 360 of FIG. 2. The process 400 is combinable with any of the embodiments described herein.

In the process 400, a first data structure 402 and a second data structure 404 may be in a first data format (e.g., BFloat 16). Process 400 may interleave data 406 to interleave the first data structure 402 and the second data structure 404 to generate an interleaved data structure 416 that is stored in a data storage 414. The data storage 414 may be a cache, memory, solid-state drive, hard-disk drive, etc. For example, to interleave data 406, the process 400 may execute the following First Pseudocode:

First Pseudocode

```
# Broadcast 0xFFFF0000 to vector size
BROADCAST: VS0 <- [0xFFFF0000]
FOR EACH _n in N
    # Load source data as integer with vector size
    LOAD VECTOR: VS1 <- src[_n][:]
    # Bitwise AND for packed integers into temp vector
    AND: VT <- VS0 and VS1
    IF _n % 2 equal 0
        # Store temp vector into target address
        STORE VECTOR: dst[_n][:] <- VT
    ELSE
        # Shift 2 bytes towards right for VT
        RIGHT SHIFT: VT2 <- (VT >> (2*8))
        # Load last stored vector
        LOAD VECTOR: VS1 <- dst[_n - 1][:]
        # Bitwise OR for packed integers
        OR: VS1 <- VS1 or VT2
        # Store vector into target address
        STORE VECTOR: dst[_n - 1][:] <- VS1
    ENDIF
ENDFOR
```

"N" may be limited by a number of hardware registers (e.g., vector registers). Execution of the above first pseudocode may alternately store the data for the first data structure 402 and the data for the second data structure 404 in the interleaved data structure 416. For example, bits 402a-402h may be part of the first data structure 402 while bits 404a-404h may be part of the second data structure 404.

Process 400 may then extract data 408 from the interleaved data structure 414. For example, the following Second Pseudocode may be executed to extract the data 408 from the interleaved data structure 416:

Second Pseudocode

```
FOR EACH _n in N
    # Clear accumulation matrix
    RESET VECTOR: f32_VC[_n][:] <- 0
ENDFOR
FOR EACH _v IN V
    FOR EACH _n IN N
        IF _n % 2 equal 0
            # Load bfloat16 data as float data
            # from B with vector size
            LOAD VECTOR: f32_VB <- B[_n][:]
        ELSE
            # Load vector data from last address minus 1
            LOAD VECTOR: f32_VB <- (&B[_n - 1][:] - 1)
        # Load bfloat16 scalar from A as float,
        # same decoding method as B.
        LOAD SCALAR: f32 <- (&A[_n][_v] - 1)
        # Broadcast above scalar to vector
        BROADCAST: f32_VA <- f32
        # Fused multiply and accumulation
        FMA: f32_VC[_n][:] <- f32_VA * f32_VB + f32_VC[_n][:]
    ENDFOR
ENDFOR
FOR EACH _n in N
    STORE: C[_n][:] <- f32_VC[_n][:]
ENDFOR
```

Thus, to extract (e.g., LOAD) the extracted first data structure 410 (that was originally in the first data format)

from the interleaved data structure 416, process 400 may start loading by subtracting two bytes from a current address 418 in the data storage 414 and read data directly in the form of Float32. Thus, process 400 may load data in a first data format (e.g., BFloat16) from the data storage 414 with a second data format (e.g., Float32 instructions) and obtain the second data format (e.g., Float32) value to avoid penalties associated with first data format instructions (e.g., first data format to second data format conversions).

For example, other implementations may incur performance penalties to convert data from the first data format to the second data format when retrieving data in the first data format from the data storage 414. For example, other implementations may require specific instructions that are latency and computationally intensive, such as "VECTOR CONVERT" and "SCALAR CONVERT." For example, "VECTOR CONVERT" may have a larger throughput than other instructions, such as a FMA instruction, and thus the "VECTOR CONVERT" will block FMA launch until completion. Thus, the "VECTOR CONVERT" may slow down the overall software pipeline. SCALAR CONVERT brings more negative effects as well. The above problems may be exacerbated when there is no hardware or compiler supporting for conversions, such as BFloat16 scalar conversion. In brief, these limitations impede throughput and efficiency.

In contrast, the above process 400 avoids calling such costly instructions and instead incorporates an interleaved model during storing and loading to generate the extracted first data structure 410 in the second data format, and the extracted second data structure 412 in the second data format. In some embodiments, the extracted first data structure 410 and the extracted second data structure 412 may form the basis of a mathematical operation together. In some embodiments the extracted first data structure 410 may be utilized in a first mathematical operation and the extracted second data structure 412 may be utilized in a second mathematical operation different from the first mathematical operation. That is, the extracted first data structure 410 and the extracted second data structure 412 may be part of different processes.

As already discussed, the bits 404a-404h associated with the extracted first data structure 410 may be treated as noise, and the bits 402a-402h associated with the extracted second data structure 412 may be treated as noise. Doing so may enhance processing and accuracy of computations.

Figure 4:
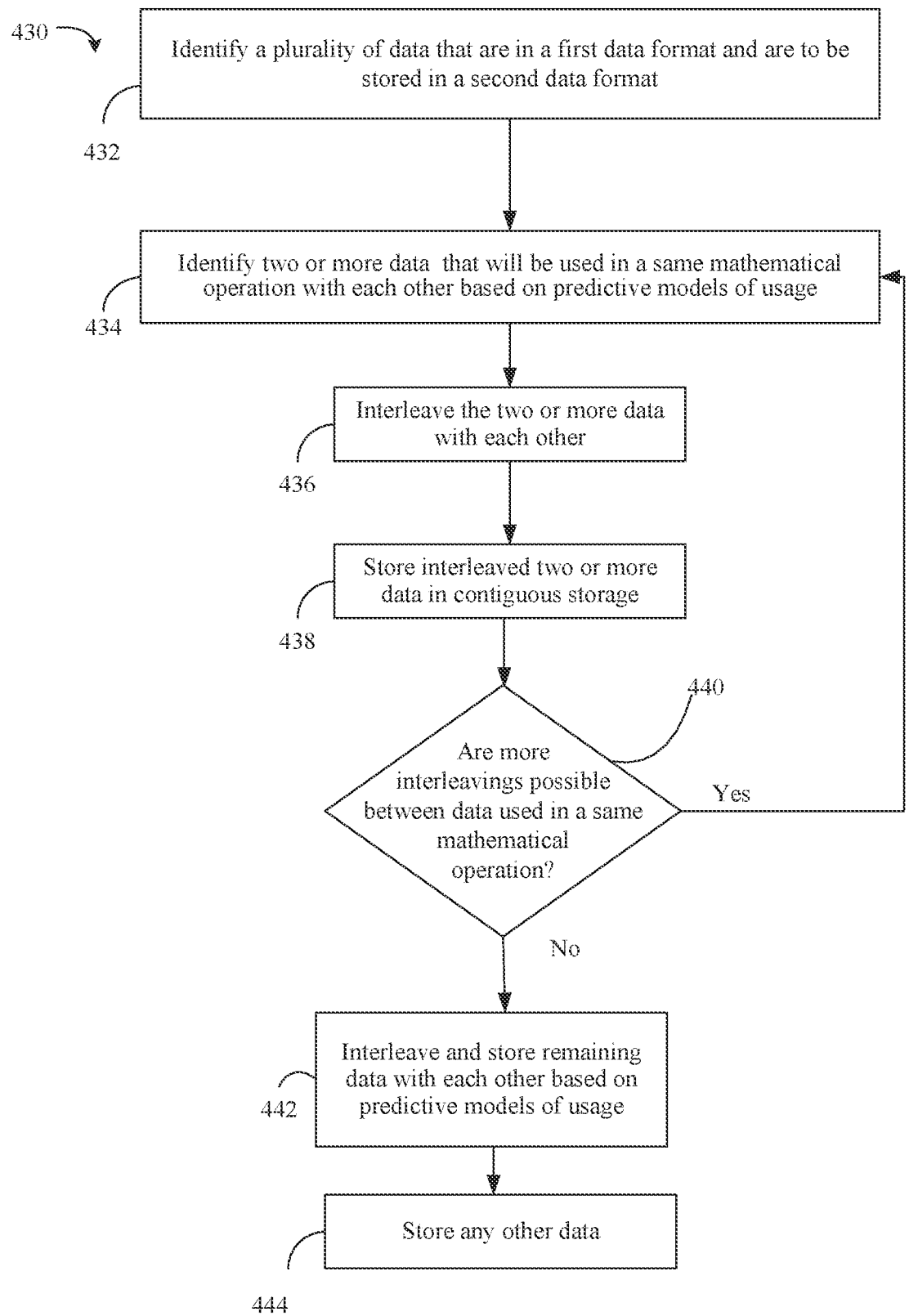
FIG. 4 is a flowchart of an example of a method of interleaving and storing data based on predictive models of usage according to an embodiment.

FIG. 4 illustrates a method 430 to interleave and store data based on predictive models of usage. The method 430 may generally be implemented in conjunction with any of the embodiments described herein, such as, for example the process 300 (FIGS. 1A and 1B), the method 360 (FIG. 2) and the process 400 (FIG. 3) already discussed. More particularly, the method 430 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 432 identifies a plurality of data that are in a first data format (e.g., BF16) and are to be stored in a second data format (e.g., FP32). For example, illustrated processing block 432 may identify that the precision of the first data format is acceptable for some mathematical operations, but that underlying hardware may operate on the second data format.

Illustrated processing block 434 identifies two or more data from the plurality of data that will be used in a same mathematical operation with each other based on predictive models of usage. The predictive models of usage may be based on historical models of usage, artificial intelligence analysis, prefetching techniques and so forth. Illustrated processing block 436 interleaves the two or more data with each other to convert the two or more data from the first data format to the second data format. Illustrated processing block 438 stores that interleaved two or more data in contiguous memory.

Illustrated processing block 440 identifies whether more interleavings are possible between data used in a same mathematical operation. For example, processing block 440 may determine from the predictive models of usage that more potential numbers may be interleaved, and therefore illustrated processing block 434 executes. If however, no interleavings are possible based on data that will be in a same mathematical operation, illustrated processing block 442 interleaves and stores remaining data with each other based on predicted usage. For example, even if two data will not be inputs into a same mathematical process, processing block 442 may determine that the two data will be utilized in close temporal proximity to each other (e.g., concurrently or one in quick succession after the other) in different mathematical processes. Thus, to reduce latency prone multiple retrievals (e.g., from long-term storage) the two data may be interleaved and stored in a cache or registers. Therefore, illustrated processing block 442 interleaves the remaining data together to enhance the possibility that interleaved data may be loaded only once. Illustrated processing block 444 stores any other data that has not been yet stored.

Figure 5:
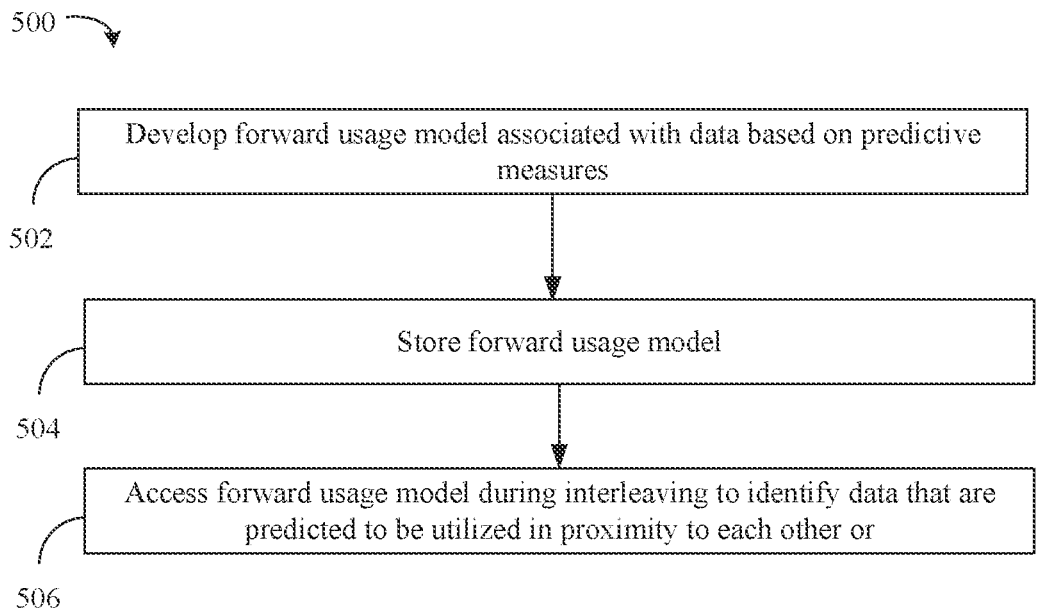
FIG. 5 is a flowchart of an example of a method of developing a forward usage model according to an embodiment.

FIG. 5 illustrates a method 500 to develop a forward usage model (e.g., predictive models of usage). The method 500 may generally be implemented in conjunction with any of the embodiments described herein, such as, for example the process 300 (FIGS. 1A and 1B), the method 360 (FIG. 2), process 400 (FIG. 3) and the method 430 (FIG. 4) already discussed. For example, the forward usage model may be a predictive model of usage as described in FIG. 4. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 develops a forward usage model associated with data based on predictive measures. The predictive measures may be historical models of usage, artificial intelligence analysis, prefetching techniques and so forth. Illustrated processing block 504 stores the forward usage model. Illustrated processing block 506 accesses the forward usage model during interleaving to identify data that are predicted to be utilized in proximity (e.g., concurrently in a same mathematical operation or in different mathematical operations) to each other.

Figure 6:
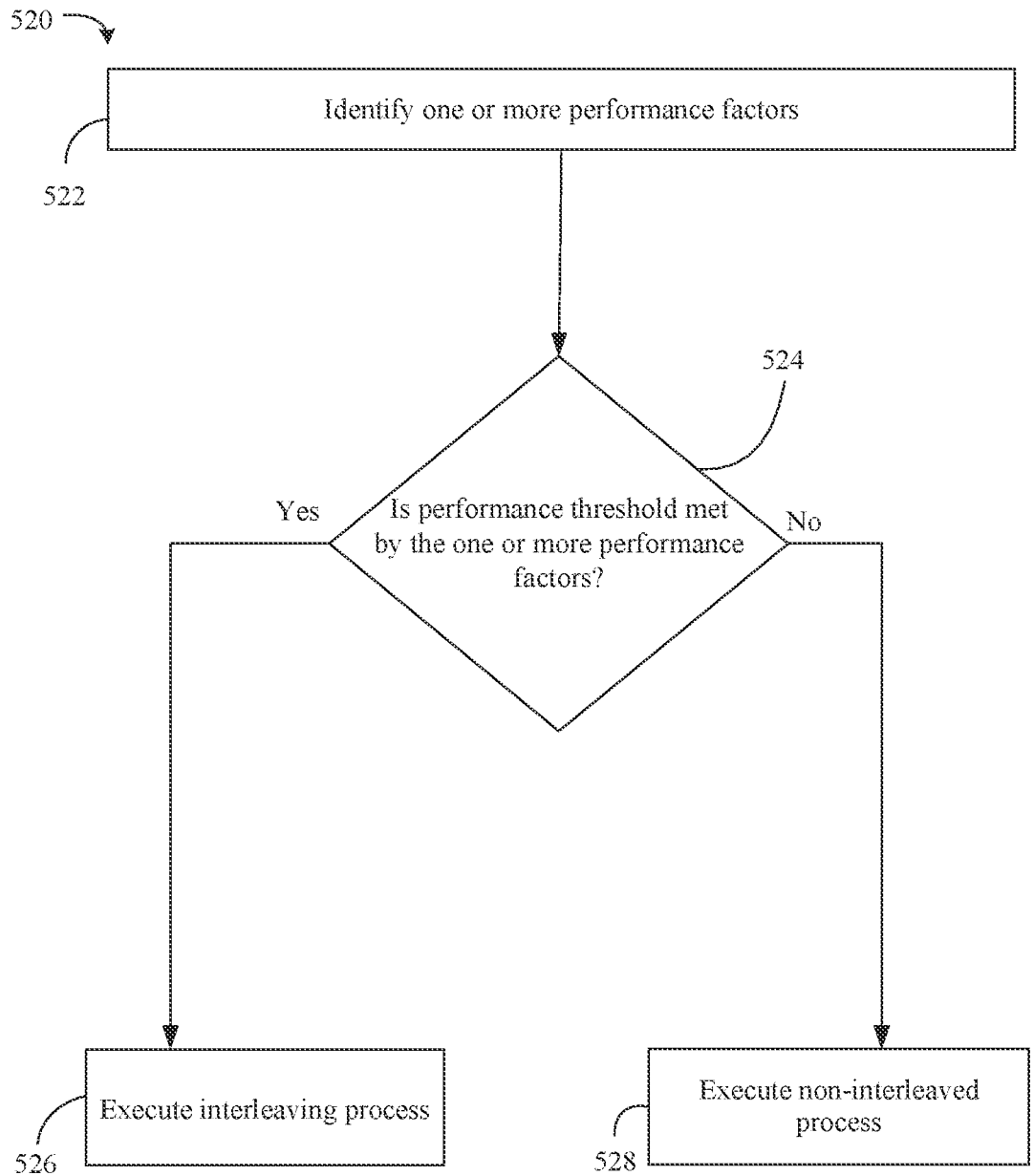
FIG. 6 is a flowchart of an example of a method of triggering an interleaving process according to an embodiment.

FIG. 6 illustrates a method 520 that triggers an interleaving process. The method 520 may generally be implemented in conjunction with any of the embodiments described herein, such as, for example the process 300 (FIGS. 1A and 1B), the method 360 (FIG. 2), process 400 (FIG. 3), the method 430 (FIG. 4) and the method 500 (FIG. 5) already discussed. More particularly, the method 520 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 522 identifies one or more performance factors. For example, the one or more performance factors may include identifying if a data format mismatch is present. For example, a data format mismatch may be present when an application may execute based on data in a first data format, and an underlying hardware architecture operates on a second data format. The one or more performance factors may further include identifying a computational workload and/or an amount of available resources. Illustrated processing block 524 determines if a performance threshold is met by the one or more performance factors. For example, the performance threshold may be met when one or more of the data mismatch is present, if the computational workload is below a computational threshold and/or the available resources are above a resource threshold.

If a performance threshold is met, illustrated processing block 526 executes an interleaving process as already described herein to store and interleave data. Otherwise, illustrated processing block 528 executes a non-interleaved process to store data in a non-interleaved fashion.

Figure 7:
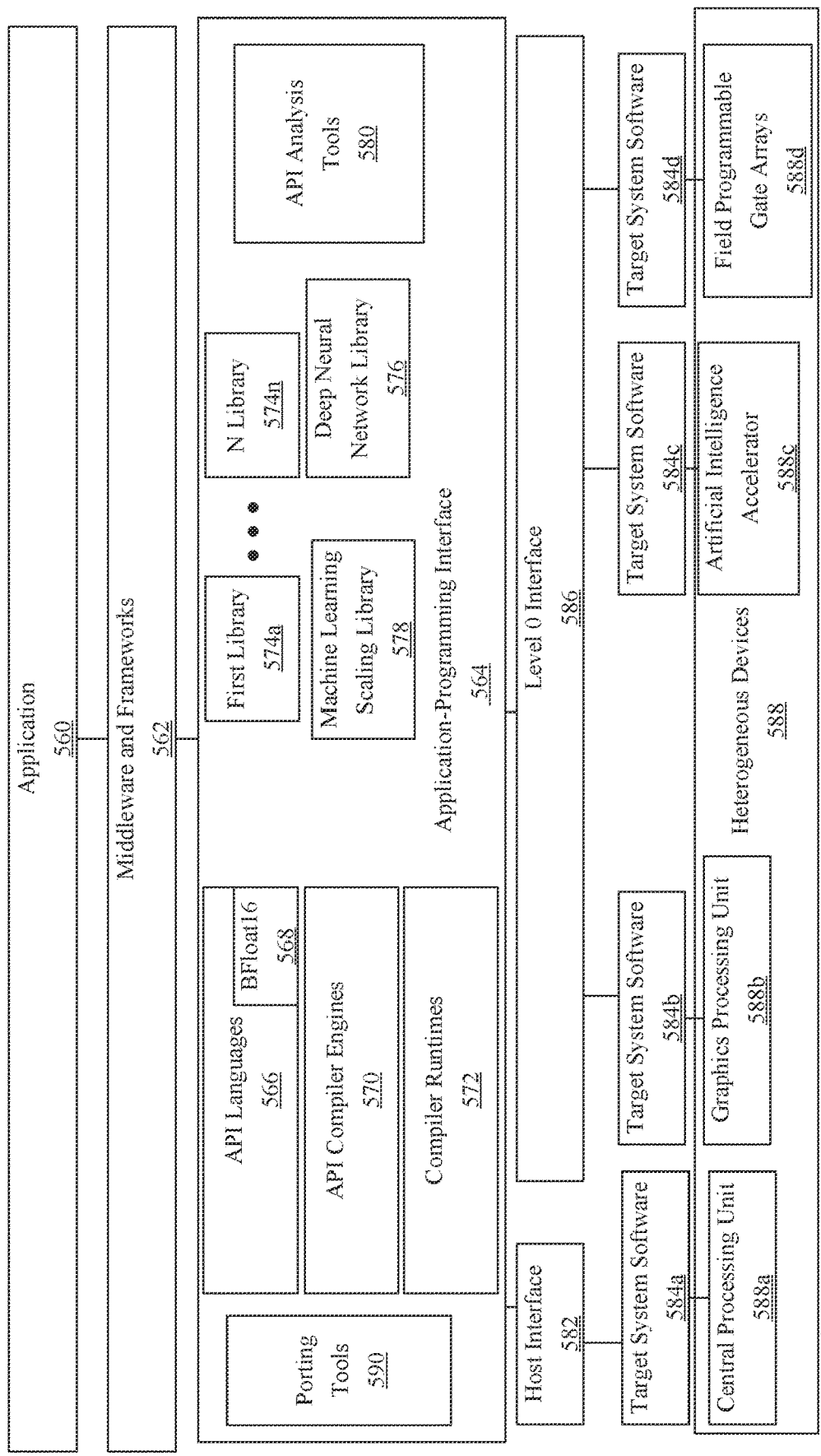
FIG. 7 is an application-programming interface according to an embodiment.

FIG. 7 illustrates an architecture 510 that includes API 564 (e.g., ONEAPI) that provides a developer interface to deploy BFloat16 568 models into the API software stack within API languages 566. The API 564 may deploy a BFloat16 storage type into a compiler extension or library implementation with a universal solution that is nearly transparent to a user but retains the benefits as described above. The deep neural network library 576 and the machine learning scaling library 578 may further deploy BFloat16 models. The API 564 may generally be implemented in conjunction with any of the embodiments described herein, such as, for example the process 300 (FIGS. 1A and 1B), the method 360 (FIG. 2), process 400 (FIG. 3), the method 430 (FIG. 4), the method 500 (FIG. 5) and the method 520 (FIG. 6) already discussed. The API compiler engines 570 and/or compiler runtimes 572 may include a compile extension to support BFloat16 storage type and expose intrinsic-like API.

For example, the API languages 566 may support storing (interleaving) and loading (retrieving interleaved numbers) as described above. The API compiler engines 570 may include intrinsic functions to execute the storing and loading. For example, the API languages 566 and/or the API compiler engines 570 may accept two Bfloat16 vectors as inputs, and automatically store underlying data with the interleaved distribution as described above. The API languages 566 and/or the API compiler engines 570 load vector size BFloat16 elements and convert to corresponding floatpoint elements.

Thus, the API 564 may provide an efficient interface for end users that use API programming languages directly. The API languages 566, API compiler engines 570, compiler runtimes 572 and porting tools 590 may be directly programmable by an end-user. The first library 574a to N-library 574n, machine learning scaling library 578, deep neural network library 576 and API analysis tools 580 may be API-based programming. The API 564 may implement a BFloat16 storage type in the first library 574a to N-library 574n, machine learning scaling library 578, deep neural network library 576. Thus, the first library 574a to N-library 574n, the machine learning scaling library 578, the deep neural network library 576 may additionally implement one or more aspects of the embodiments as described herein.

For example, the deep neural network library 576 and machine learning scaling library 578 may be two components of the API 564 that are of interest and used by variants of Deep Learning workloads. Both the deep neural network library 576 and machine learning scaling library 578 may integrate the embodiments described herein and allow for transparency for high level developers or end users.

As illustrated, the architecture 510 includes a plurality of heterogeneous devices 588 (588a-588d) such as, for example, a central processing unit (CPU, e.g., host processor) 588a to implement scalar functions, a graphics processing unit (GPU, e.g., graphics processor with highly parallel processing capabilities) 588b to implement vector functions, an artificial intelligence (AI) accelerator 588c to implement matrix functions and a field programmable gate array (FPGA) 588d to implement spatial functions. Target system software 584a, 584b, 584c, 584d may interact with the heterogeneous devices 588 as an intermediary between the API 564 and the heterogeneous devices 588. The heterogeneous devices 588 may execute processes associated with the application 560 that are received via the API 564 and middleware and frameworks 562, such as mathematical operations based on interleaved data. The Level 0 interface 586 may implement the above functionalities for the GPU 588b, the AI accelerator 588c and the FPGA 588d. The host interface 582 may implement the above functionalities for the CPU 588a.

Figure 8:
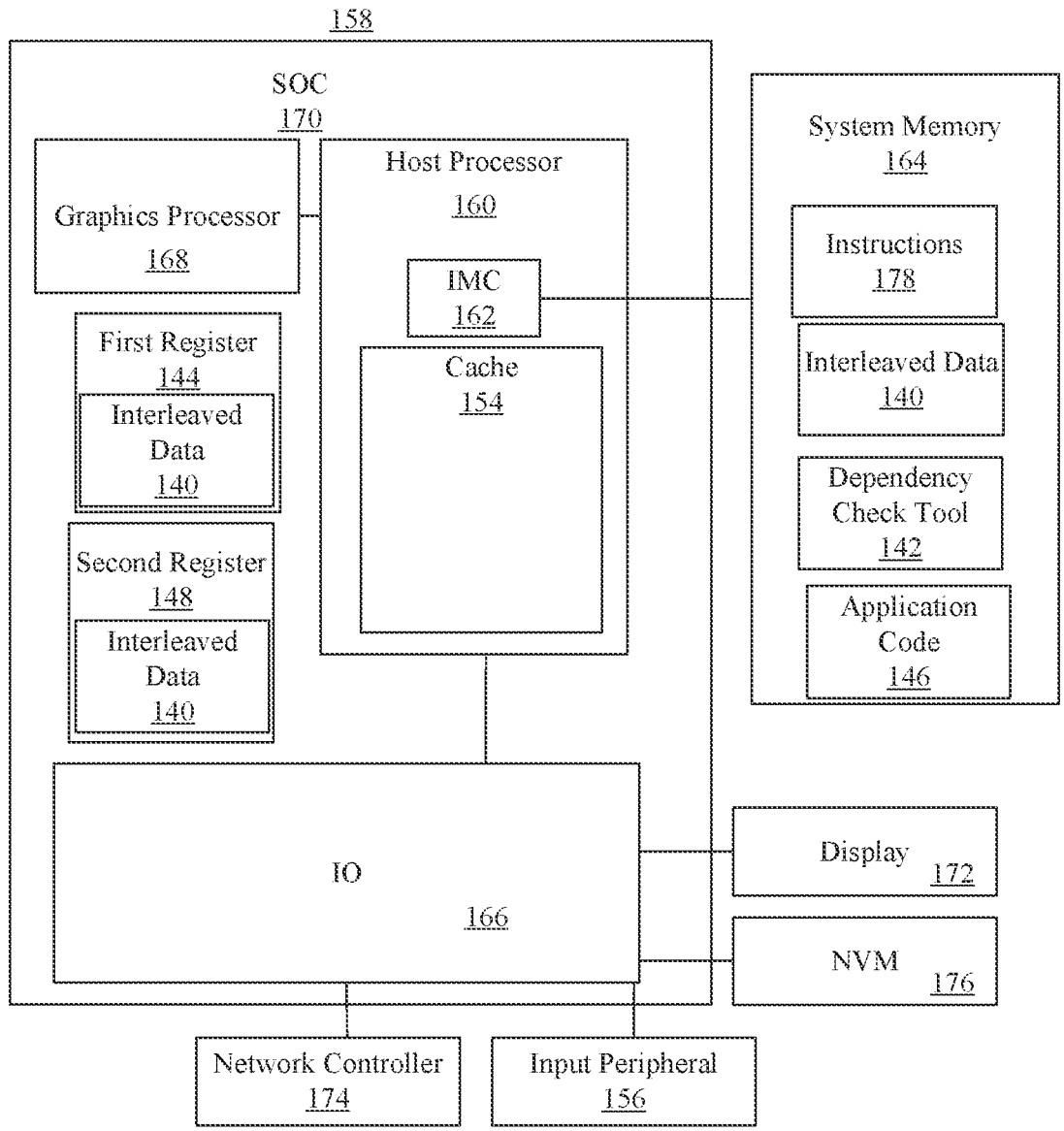
FIG. 8 is a block diagram of an example of a computing system according to an embodiment.

Turning now to FIG. 8, a memory bandwidth enhanced computing system 158 (e.g., server or node) is shown. The computing system 158 is combinable with any of the embodiments described herein, such as, for example the process 300 (FIGS. 1A and 1B), the method 360 (FIG. 2), process 400 (FIG. 3), the method 430 (FIG. 4), the method 500 (FIG. 5), the method 520 (FIG. 6) and the API 564 (FIG. 7) already discussed. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164.

The illustrated system 158 also includes a graphics processor 168 (e.g., graphics processing unit/GPU) and an input output (10) module 166 implemented together with the host processor 160 (e.g., as microcontrollers) on a semiconductor die 170 as a SOC, where the 10 module 166 may communicate with, for example, a display 172 (e.g., touch screen, liquid crystal display/LCD, light emitting diode/LED display), an input peripheral 156 (e.g., mouse, keyboard, microphone), a network controller 174 (e.g., wired and/or wireless), and mass storage 176 (e.g., HDD, optical disc, SSD, flash memory or other NVM).

In some embodiments, the SOC 170 may utilize dependency check tool 142 to parse an application code 146 to generate a forward usage model. In detail, the SOC 170 may implement instructions stored on, for example, the NVM 176 and/or system memory 164 to parse the application code 146. The application code 146 may be stored on other storage devices, such as cache 154.

The host processor 160 may communicate with another computing device (e.g., a node in a neural network) via the network controller 174. The computing system 158 may provide data to other nodes in a neural network through the network controller 174.

The host processor 160 may generate interleaved data 140 based on the forward usage model and/or application code 146. In some embodiments, the network controller 174 may receive first and second data from another node. The host processor 160 may store the first and second data as interleaved data 140 in the system memory 164. When the interleaved data 140 is needed for processing, the host processor 160 may load the interleaved data 140 in the first and second hardware registers 144, 148. In some embodiments, the host processor 160 may only store the interleaved data 140 in one of the first and second registers 144, 148. The host processor 160 may then process the interleaved data 140. In some embodiments, the graphics processor 168 may execute aspects of the generation of the interleaved data 140, storing of the interleaved data 140 into system memory 164, loading of the interleaved data 140 into one or more of the first or second registers 144, 148 and processing of the interleaved data 140. In some embodiments, the system memory 164 is coupled to the host processor 160 and the graphics processor 168, and includes a set of instructions 178, which when executed by one or more of the graphics processor 168 or the host processor (e.g., a central processing unit), cause the computing system 158 to execute one or more of the embodiments described herein.

Figure 9:
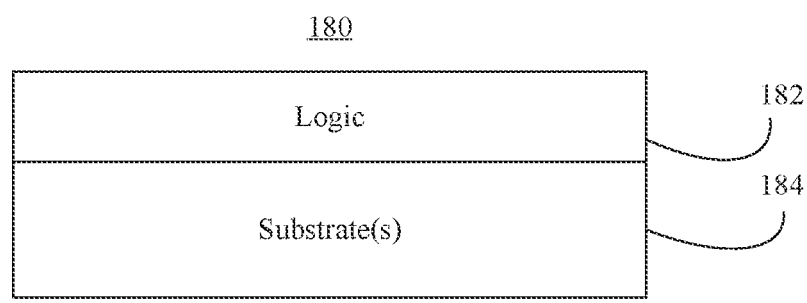
FIG. 9 is an illustration of an example of a semiconductor apparatus according to an embodiment.

FIG. 9 shows a semiconductor package apparatus 180. The semiconductor package apparatus 180 is combinable with any of the embodiments described herein, such as, for example the process 300 (FIGS. 1A and 1B), the method 360 (FIG. 2), process 400 (FIG. 3), the method 430 (FIG. 4), the method 500 (FIG. 5), the method 520 (FIG. 6), the API 564 (FIG. 7) and the computing system 158 (FIG. 8) already discussed. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the process 300 (FIGS. 1A and 1B), the method 360 (FIG. 2), process 400 (FIG. 3), the method 430 (FIG. 4), the method 500 (FIG. 5), the method 520 (FIG. 6), the API 564 (FIG. 7) and the computing system 158 (FIG. 8) already discussed. In some embodiments, the logic 182 may interleave data, store the data, load the data and process the data.

Figure 10:
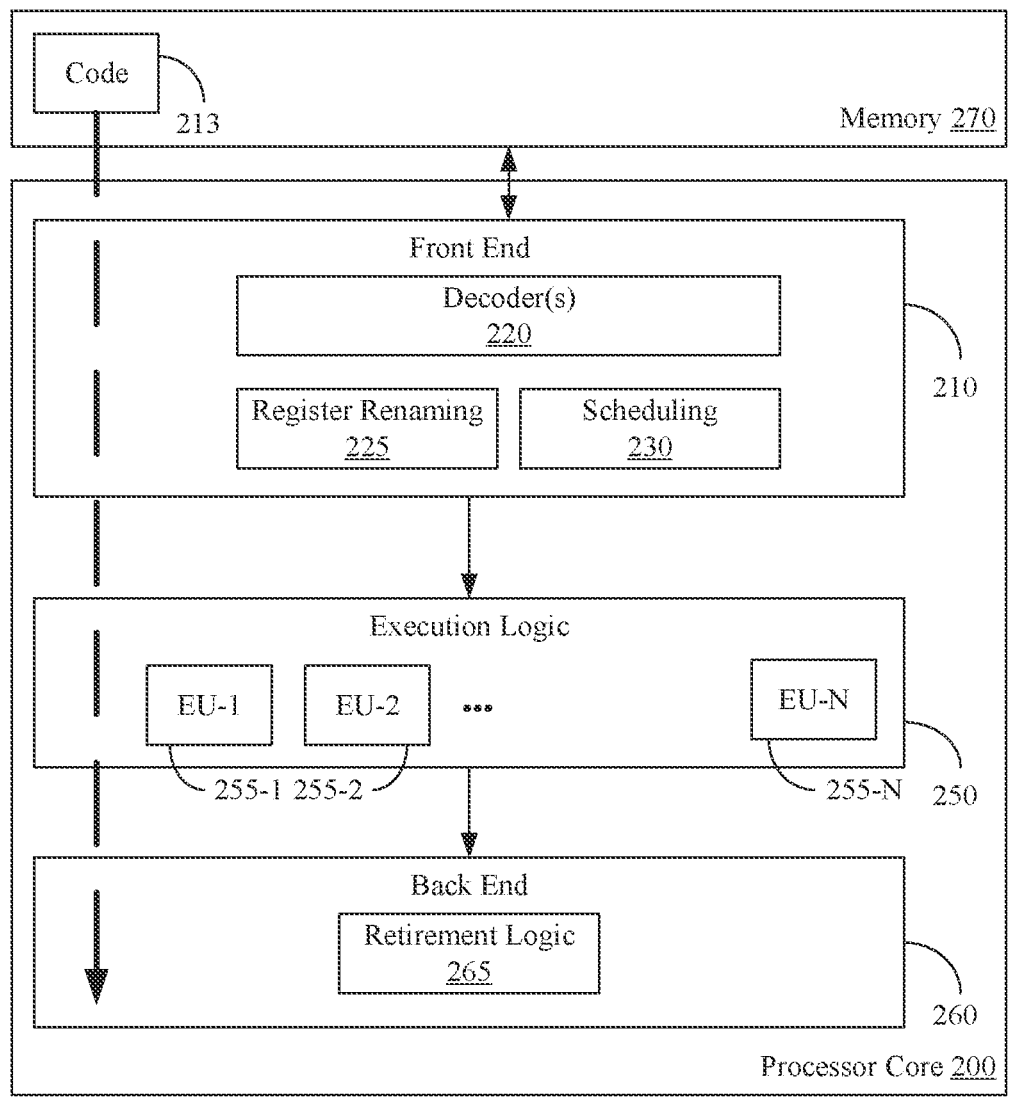
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the process 300 (FIGS. 1A and 1B), the method 360 (FIG. 2), process 400 (FIG. 3), the method 430 (FIG. 4), the method 500 (FIG. 5), the method 520 (FIG. 6) and the API 564 (FIG. 7) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
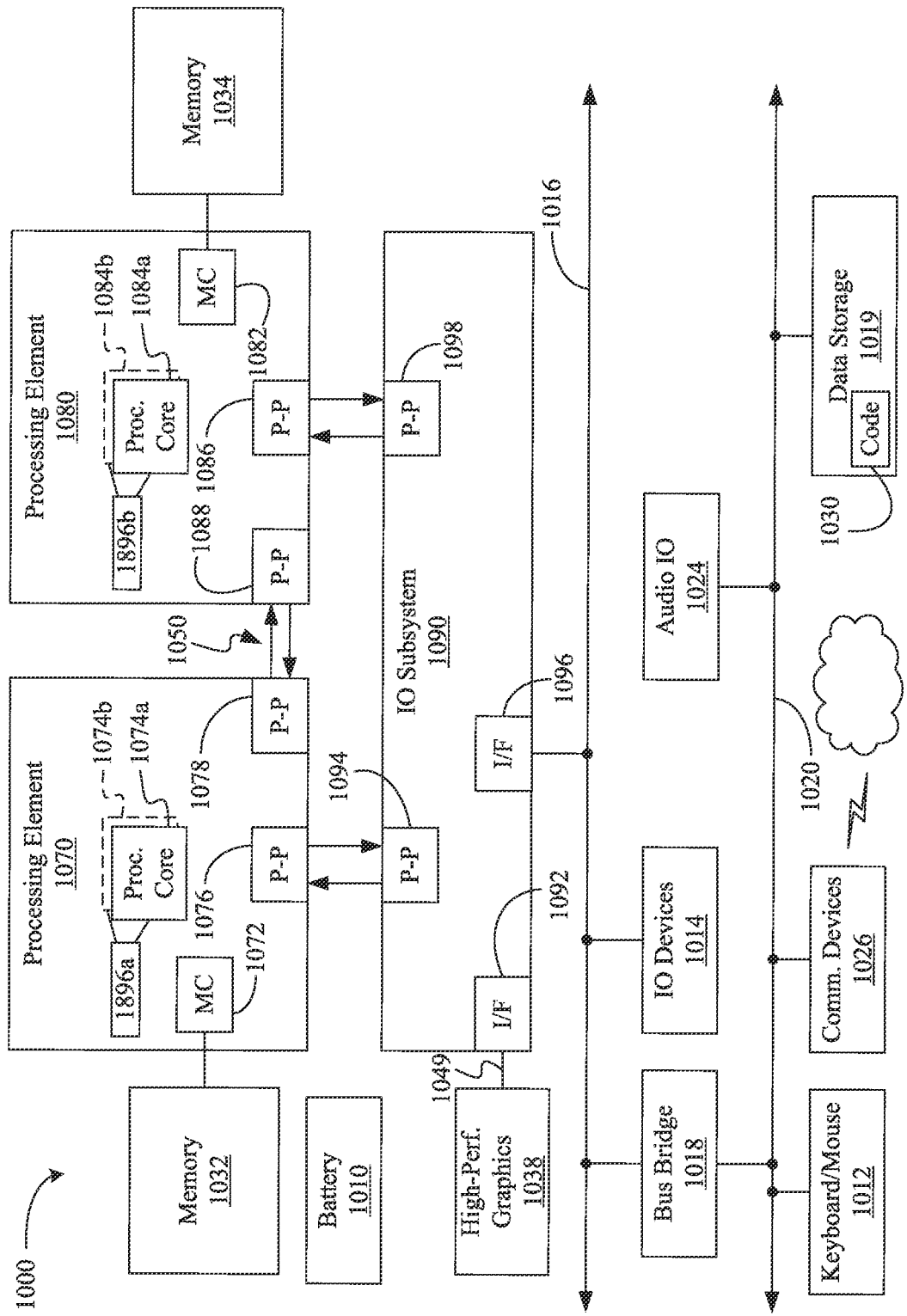
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores

1074*a*, 1074*b*, 1084*a*, 1084*b* may be configured to execute instruction code in a manner similar to that discussed above in connection with FIG. 10.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the process 300 (FIGS. 1A and 1B), the method 360 (FIG. 2), process 400 (FIG. 3), the method 430 (FIG. 4), the method 500 (FIG. 5), the method 520 (FIG. 6) and the API 564 (FIG. 7) already discussed. Further, an audio I/O 1024 may be coupled to second bus 1020 and a battery 1010 may supply power to the computing system 1000.

Note that other embodiments are contemplated. For example, instead of the point-to-point architecture of FIG. 11 a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 may include a computing system comprising a data storage, a graphics processor, a central processing unit, and a memory including a set of instructions, which when executed by one or more of the graphics processor or the central processing unit, cause the computing system to identify first data and second data to be stored in the data storage, wherein each of the first data and the second data are to be in a first data format, and interleave the first data with the second data, wherein the interleaved first and second data are to be in a second data format, and wherein the second data format is different from the first data format.

Example 2 may include the system of example 1, wherein the instructions, when executed, cause the computing system to cause the interleaved first and second data to be stored in the data storage, wherein bits of the first data alternate with bits of the second data in the data storage.

Example 3 may include the system of example 1, wherein the instructions, when executed, cause the computing system to cause the interleaved first and second data to be loaded into a hardware register.

Example 4 may include the system of example 1, wherein a size of the first data format is half of a size of the second data format.

Example 5 may include the system of example 1, wherein the instructions, when executed, cause the computing system to load the interleaved first and second data, extract the first and second data from the interleaved first and second data, and execute a mathematical operation based on the extracted first data and the extracted second data.

Example 6 may include the system of any one of examples 1 to 5, wherein the first data format is a brain floating-point format and the second data format is a floating-point format.

Example 7 may include a semiconductor apparatus comprising one or more substrates, and logic coupled to the one or more substrates, wherein the logic is implemented in one or more of configurable logic or fixed-functionality logic hardware, the logic coupled to the one or more substrates to identify first data and second data to be stored in a data storage, wherein each of the first data and the second data are to be in a first data format, and interleave the first data with the second data, wherein the interleaved first and second data are to be in a second data format, and wherein the second data format is different from the first data format.

Example 8 may include the semiconductor apparatus of example 7, wherein the logic is to cause the interleaved first and second data to be stored in the data storage, wherein bits of the first data alternate with bits of the second data in the data storage.

Example 9 may include the semiconductor apparatus of example 7, wherein the logic coupled to the one or more substrates is to cause the interleaved first and second data to be loaded into a hardware register.

Example 10 may include the semiconductor apparatus of example 7, wherein a size of the first data format is half of a size of the second data format.

Example 11 may include the semiconductor apparatus of example 7, wherein the logic coupled to the one or more substrates is to load the interleaved first and second data, extract the first and second data from the interleaved first and second data, and execute a mathematical operation based on the extracted first data and the extracted second data.

Example 12 may include the semiconductor apparatus of any one of examples 7 to 11, wherein the first data format is a brain floating-point format and the second data format is a floating-point format.

Example 13 may include at least one computer readable storage medium comprising a set of instructions, which when executed by a computing device, cause the computing device to identify first data and second data to be stored in a data storage, wherein each of the first data and the second data are to be in a first data format, and interleave the first data with the second data, wherein the interleaved first and second data are to be in a second data format, and wherein the second data format is different from the first data format.

Example 14 may include the at least one computer readable storage medium of example 13, wherein the instructions, when executed, cause the computing device to cause the interleaved first and second data to be stored in the data storage, wherein bits of the first data alternate with bits of the second data in the data storage.

Example 15 may include the at least one computer readable storage medium of example 13, wherein the instructions, when executed, cause the computing device to cause the interleaved first and second data to be loaded into a hardware register.

Example 16 may include the at least one computer readable storage medium of example 13, wherein a size of the first data format is half of a size of the second data format.

Example 17 may include the at least one computer readable storage medium of example 13, wherein the instructions, when executed, cause the computing device to load the interleaved first and second data, extract the first and second data from the interleaved first and second data, and execute a mathematical operation based on the extracted first data and the extracted second data.

Example 18 may include the at least one computer readable storage medium of any one of examples 13 to 17, wherein the first data format is a brain floating-point format and the second data format is a floating-point format.

Example 19 may include a method comprising identifying first data and second data to be stored in a data storage, wherein each of the first data and the second data are in a first data format, and interleaving the first data with the second data, wherein the interleaved first and second data are in a second data format, and wherein the second data format is different from the first data format.

Example 20 may include the method of example 19, further comprising causing the interleaved first and second data to be stored in the data storage, wherein bits of the first data alternate with bits of the second data in the data storage.

Example 21 may include the method of example 19, further comprising causing the interleaved first and second data to be loaded into a hardware register.

Example 22 may include the method of example 19, wherein a size of the first data format is half of a size of the second data format.

Example 23 may include the method of example 19, further comprising loading the interleaved first and second data, extracting the first and second data from the interleaved first and second data, and executing a mathematical operation based on the extracted first data and the extracted second data.

Example 24 may include the method of any one of examples 19 to 23, wherein the first data format is a brain floating-point format and the second data format is a floating-point format.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
  a data storage;
  a graphics processor;
  a central processing unit; and
  a memory including a set of instructions, which when executed by one or more of the graphics processor or the central processing unit, cause the computing system to:
    identify first data and second data to be stored in the data storage, wherein each of the first data and the second data are to be in a first data format;
    interleave the first data with the second data to generate interleaved data, wherein the interleaved data is to be in a second data format, and wherein the second data format is different from the first data format;
    generate decoded first values from the interleaved data, wherein the decoded first values include the second data being treated as first noise and the first data being maintained; and
    execute a mathematical operation based on the decoded first values such that the second data is treated as the first noise and the first data is processed.

2. The system of claim 1, wherein the instructions, when executed, cause the computing system to:
  cause the interleaved data to be stored in the data storage, wherein bits of the first data alternate with bits of the second data in the data storage.

3. The system of claim 1, wherein the instructions, when executed, cause the computing system to:
  cause the interleaved data to be loaded into a hardware register.

4. The system of claim 1, wherein a size of the first data format is half of a size of the second data format.

5. The system of claim 1, wherein the first data format is a brain floating-point format and the second data format is a floating-point format.

6. The system of claim 1, wherein the instructions, when executed, cause the computing system to:
  generate decoded second values from the interleaved data, wherein the decoded second values includes the first data being treated as second noise and the second data being maintained,
  wherein to execute the mathematical operation, the instructions, when executed, cause the computing system to generate a final value based on the decoded second values.

7. A semiconductor apparatus comprising:
  one or more substrates; and
  logic coupled to the one or more substrates, wherein the logic is implemented in one or more of configurable logic or fixed-functionality logic hardware, the logic coupled to the one or more substrates to:
    identify first data and second data to be stored in a data storage, wherein each of the first data and the second data are to be in a first data format;
    interleave the first data with the second data to generate interleaved data, wherein the interleaved data is to be in a second data format, and wherein the second data format is different from the first data format;
    generate decoded first values from the interleaved data, wherein the decoded first values include the second data being treated as first noise and the first data being maintained; and
    execute a mathematical operation based on the decoded first values such that the second data is treated as the first noise and the first data is processed.

8. The semiconductor apparatus of claim 7, wherein the logic is to:
  cause the interleaved data to be stored in the data storage, wherein bits of the first data alternate with bits of the second data in the data storage.

9. The semiconductor apparatus of claim 7, wherein the logic coupled to the one or more substrates is to:
  cause the interleaved data to be loaded into a hardware register.

10. The semiconductor apparatus of claim 7, wherein a size of the first data format is half of a size of the second data format.

11. The semiconductor apparatus of claim 7, wherein the first data format is a brain floating-point format and the second data format is a floating-point format.

12. The semiconductor apparatus of claim 7, wherein the logic coupled to the one or more substrates is to:
  generate decoded second values from the interleaved data, wherein the decoded second values includes the first data being treated as second noise and the second data being maintained,
  wherein to execute the mathematical operation, the logic coupled to the one or more substrates is to generate a final value based on the decoded second values.

13. At least one non-transitory computer readable storage medium comprising a set of instructions, which when executed by a computing device, cause the computing device to:
  identify first data and second data to be stored in a data storage, wherein each of the first data and the second data are to be in a first data format;
  interleave the first data with the second data to generate interleaved data, wherein the interleaved data is to be in a second data format, and wherein the second data format is different from the first data format;
  generate decoded first values from the interleaved data, wherein the decoded first values include the second data being treated as first noise and the first data being maintained; and
  execute a mathematical operation based on the decoded first values such that the second data is treated as the first noise and the first data is processed.

14. The at least one non-transitory computer readable storage medium of claim 13, wherein the instructions, when executed, cause the computing device to:
  cause the interleaved data to be stored in the data storage, wherein bits of the first data alternate with bits of the second data in the data storage.

15. The at least one non-transitory computer readable storage medium of claim 13, wherein the instructions, when executed, cause the computing device to:

cause the interleaved data to be loaded into a hardware register.

16. The at least one non-transitory computer readable storage medium of claim 13, wherein a size of the first data format is half of a size of the second data format.

17. The at least one non-transitory computer readable storage medium of claim 13, wherein the first data format is a brain floating-point format and the second data format is a floating-point format.

18. The at least one non-transitory computer readable storage medium of claim 13, wherein the instructions, when executed, cause the computing device to:
generate decoded second values from the interleaved data, wherein the decoded second values includes the first data being treated as second noise and the second data being maintained,
wherein to execute the mathematical operation, instructions, when executed, cause the computing device to generate a final value based on the decoded second values.

19. A method comprising:
identifying first data and second data to be stored in a data storage, wherein each of the first data and the second data are in a first data format;
interleaving the first data with the second data to generate interleaved data, wherein the interleaved data is in a second data format, and wherein the second data format is different from the first data format;
generating decoded first values from the interleaved data, wherein the decoded first values includes the second data being treated as first noise and the first data being maintained; and
executing a mathematical operation based on the decoded first values such that the second data is treated as the first noise and the first data is processed.

20. The method of claim 19, further comprising:
causing the interleaved data to be stored in the data storage, wherein bits of the first data alternate with bits of the second data in the data storage.

21. The method of claim 19, further comprising:
causing the interleaved data to be loaded into a hardware register.

22. The method of claim 19, wherein a size of the first data format is half of a size of the second data format.

23. The method of claim 19, wherein the first data format is a brain floating-point format and the second data format is a floating-point format.

24. The method of claim 19, further comprising:
generating decoded second values from the interleaved data, wherein the decoded second values includes the first data being treated as second noise and the second data being maintained,
wherein the executing the mathematical operation includes generating a final value based on the decoded second values.

* * * * *